(12) United States Patent
Jacobs (10) Patent No.: US 7,739,496 B2
(45) Date of Patent: Jun. 15, 2010

(54) SECURE PACKET-BASED DATA BROADCASTING ARCHITECTURE

(75) Inventor: Andre Jacobs, San Diego, CA (US)

(73) Assignee: Irdeto Access B.V. (NL)

( * ) Notice: Subject to any disclaimer, the term of this patent is extended or adjusted under 35 U.S.C. 154(b) by 1228 days.

(21) Appl. No.: 10/333,007

(22) PCT Filed: Jul. 13, 2001

(86) PCT No.: PCT/US01/41361

§ 371 (c)(1),
(2), (4) Date: Oct. 3, 2003

(87) PCT Pub. No.: WO02/07378

PCT Pub. Date: Jan. 24, 2002

(65) Prior Publication Data

US 2004/0064688 A1    Apr. 1, 2004

Related U.S. Application Data

(60) Provisional application No. 60/219,353, filed on Jul. 14, 2000.

(51) Int. Cl.
*H04L 9/00* (2006.01)
*H04L 29/00* (2006.01)
*H04L 29/06* (2006.01)
(52) U.S. Cl. .................. 713/160; 726/26; 380/210
(58) Field of Classification Search ........... 713/160; 726/26; 380/210
See application file for complete search history.

(56) References Cited

U.S. PATENT DOCUMENTS

| | | | | |
|---|---|---|---|---|
| 5,321,750 A | * | 6/1994 | Nadan | 380/230 |
| 5,396,490 A | * | 3/1995 | White et al. | 370/474 |
| 5,502,766 A | | 3/1996 | Boebert et al. | |
| 5,555,266 A | * | 9/1996 | Buchholz et al. | 370/347 |
| 5,563,946 A | * | 10/1996 | Cooper et al. | 705/56 |
| 5,742,677 A | * | 4/1998 | Pinder et al. | 380/242 |
| 5,771,064 A | * | 6/1998 | Lett | 725/134 |
| 5,790,806 A | * | 8/1998 | Koperda | 709/252 |

(Continued)

OTHER PUBLICATIONS

International Preliminary Examination Report for PCT/US01/41361, mailed Mar. 10, 2003.

*Primary Examiner*—Kambiz Zand
*Assistant Examiner*—William S Powers
(74) *Attorney, Agent, or Firm*—Schwegman, Lundberg & Woessner, P.A.

(57) ABSTRACT

A method for processing packets with encrypted data received by a client from a server through at least one network wherein the data packets comprise at least an encryption header (46) and payload (45), extracting the encryption header (54, 55; 69) from a data packet, extracting and decrypting the encrypted payload to form a clear data, generating a clear data packet segment. Secure packet-based transmission of content data from a server to at least one client comprises retrieving a clear data packet comprising an unencrypted payload, dividing the unencrypted payload into one or more segments, applying an encrypted algorithm to each segment to generate encrypted segments (47), generating encryption header for each encrypted segment composing a packet with encrypted data for each encrypted segment comprising the encrypted header (46), a data packet header and transmission of each of the composed packets to the client.

12 Claims, 9 Drawing Sheets

U.S. PATENT DOCUMENTS

| | | | | |
|---|---|---|---|---|
| 5,949,795 A | * | 9/1999 | Moroney et al. | 370/516 |
| 5,970,066 A | * | 10/1999 | Lowry et al. | 370/353 |
| 6,044,403 A | * | 3/2000 | Gerszberg et al. | 709/225 |
| 6,052,786 A | * | 4/2000 | Tsuchida | 726/14 |
| 6,052,819 A | * | 4/2000 | Barker et al. | 714/776 |
| 6,105,134 A | * | 8/2000 | Pinder et al. | 713/170 |
| 6,157,719 A | * | 12/2000 | Wasilewski et al. | 380/210 |
| 6,321,269 B1 | * | 11/2001 | Walker | 709/237 |
| 6,321,336 B1 | * | 11/2001 | Applegate et al. | 726/11 |
| 6,788,704 B1 | * | 9/2004 | Lindsay | 370/465 |

\* cited by examiner

SECURE PACKET-BASED DATA BROADCASTING ARCHITECTURE

CROSS-REFERENCE TO OTHER APPLICATIONS

This Application is a National Phase of International Application No. PCT/US01/41361, filed on Jul. 13, 2001, which claims priority from U.S. Provisional Patent Application No. 60/219,353, filed on Jul. 14, 2000.

BACKGROUND OF THE INVENTION

This invention relates to the area of secure packet-based broadcasting, multicasting or unicasting of content data and more particularly to the area of encryption of data encoded in packets. It also addresses the area of transferring encryption keys, entitlement information and information specifying how to retrieve keys and entitlement information, from the broadcast/multicast head-end to the users of the content.

It concerns substantially a method for processing packets with encrypted data received by a client from a head-end connected to the client through at least one network, wherein the data packets comprise at least an encryption header and an encrypted payload.

The invention also relates to a system for secure packet-based transfer of content data, comprising a head-end, that is connected to a network and comprises a receiver for receiving clear data packets from a source, an encryption unit for encrypting at least part of the data packets, and generating data packets comprising the encrypted part of the clear data packets and a network interface for sending the data packets through the network, which system further comprises at least one client connected to the network with a network interface for receiving data packets sent through the network, capable of composing data packets from data packet fragments.

The invention also relates to a method for secure packet-based transmission of content data from a head-end to at least one client, through at least one network to which the head-end and the client are connected.

Encrypting and broadcasting content is known from the field of television broadcasting. With the advent of the Internet, a start has been made with broadcasting content through this medium, using the standard protocols defined for the Internet. Content sent over the Internet must also to be encrypted to avoid illegal viewing. The receivers of the content (clients) are typically PC's, performing multiple tasks. It is important that the encryption process does not impact the performance of the client PC too much. It is also very important that the decryption mechanism is independent of network cards and applications. If this can be achieved it will provide significant cost saving for the provider of the decryption system. The application only has to be ported to new operating systems and can then be used on any configuration of network interface hardware and data processing software with any multicast or unicast application.

To be able to decrypt the encrypted information, the encryption keys have to be sent to the client (receiver and viewer of the content). To be able to determine whether a client is entitled to use or view the content the access conditions of the content have to be sent to the client. In the television broadcast environment, this information is sent as part of the content utilising a special type of message, the Entitlement Control Message (ECM). Such a message contains the encryption keys and the access conditions of the program.

In addition to the ECM, Entitlement Management Messages (EMMs) also have to be sent to the clients. An EMM is a message setting the access profile of a viewer, in other words, authorising a client to de-scramble a particular service.

To obtain a system and methods of the above-discussed kind that are independent of the configuration of the client, the invention provides a method of the above-mentioned type for processing packets with encrypted data received by a client comprising:

extracting the encryption header from a data packet;
extracting and decrypting the encrypted payload to form clear data;
generating a clear data packet header; and
generating a clear data packet fragment comprising the clear data packet header and the clear data.

By generating a clear data packet fragment comprising the clear data packet header and the clear data, the decryption process becomes transparent to the applications that use the clear data. They do not have to be adapted to the encryption format, and decryption is independent of the operating system and the applications that use the data.

In a preferred embodiment of the invention, the method further comprises providing the clear data packet fragment as input to a network protocol stack on the client that is capable of buffering clear data packet fragments and assembling them into a clear data packet. This allows for speedy decryption and sparing use of resources on the client, since a clear data packet fragment can be passed to the stack directly after decryption, without any prior buffering.

In a preferred embodiment, wherein the encryption header of the packet with encrypted data comprises information allowing assembly in the stack of a clear data packet from related clear data packet fragments, the method further comprises extracting the information from the encryption header and including it with the clear data packet fragment.

This makes the decryption process completely transparent to the stack and the applications using the clear data packets after they have been processed in the stack. Decryption is independent of the particular implementation of the network protocol stack, since no extra information has to be passed to the stack besides the information already comprised in the clear data packet fragments, which is compliant with existing standards.

The invention further provides a method of the above-mentioned type for secure packet-based transmission of content data from a head-end to at least one client, comprising:

retrieving a clear data packet comprising an unencrypted payload;
dividing the unencrypted payload into one or more fragments;
applying an encryption algorithm to each fragment to generate encrypted fragments;
generating an encryption header for each encrypted fragment;
composing a packet with encrypted data for each encrypted fragment, comprising the fragment, the encryption header and a data packet header for the fragment; and
transmitting each of the thus composed packets to the client.

Thus, because the unencrypted payload is divided into fragments and an encrypted data packet is generated for each fragment, a client receiving the encrypted data packet will not have to use a buffer to collect the entire encrypted payload before starting to decrypt the encrypted data. Instead, it can decrypt each fragment as it arrives, which demands less of the resources available at the client and speeds up the decryption process.

In a preferred embodiment, the encryption header for at least one fragment is provided with information regarding the length of the clear data packet and information regarding a checksum of the unencrypted payload, to allow re-assembly of the clear data packet at the client.

From this information, a new header can be composed at the client, before all the fragments comprising the encrypted payload have arrived. The fragment comprising this new header can immediately be passed on to the standard software for re-assembling fragments of a clear data packet, thus eliminating the need for any special software to perform this task for the packets with encrypted data in the protocol stack.

Speedy decryption and a low demand on client resources are also inherent advantages of the system of the above-mentioned type according to the invention, wherein the client comprises a decryption unit for generating clear data by decrypting encrypted data comprised in the received data packets and for generating data packet fragments from the clear data. Since the client is capable of composing data packets from data packet fragments, the data packet fragments can directly be assembled into normal clear data packets after decryption.

DESCRIPTION OF DRAWINGS

The invention will now be described in further detail with reference to the enclosed drawings, of which

DETAILED DESCRIPTION

This detailed description will provide a general overview of the operation of a system for secure packet-based transfer of content data according to the invention. It will then describe in detail the functioning of the encryption and decryption subsystems of the system and the application of the method according to the invention to encryption and decryption of IP packets.

The description will also cover the formatting of IPEMM, IPECM and IP-info messages. These messages are used in this embodiment to authorise a client to make use of a particular service, to receive data belonging to a particular service, and to identify the service and enable the client to receive the conditional access messages of the service, respectively. The description will further expand on the method that is used to transfer the conditional access messages to the client.

System Overview

Figure 1:
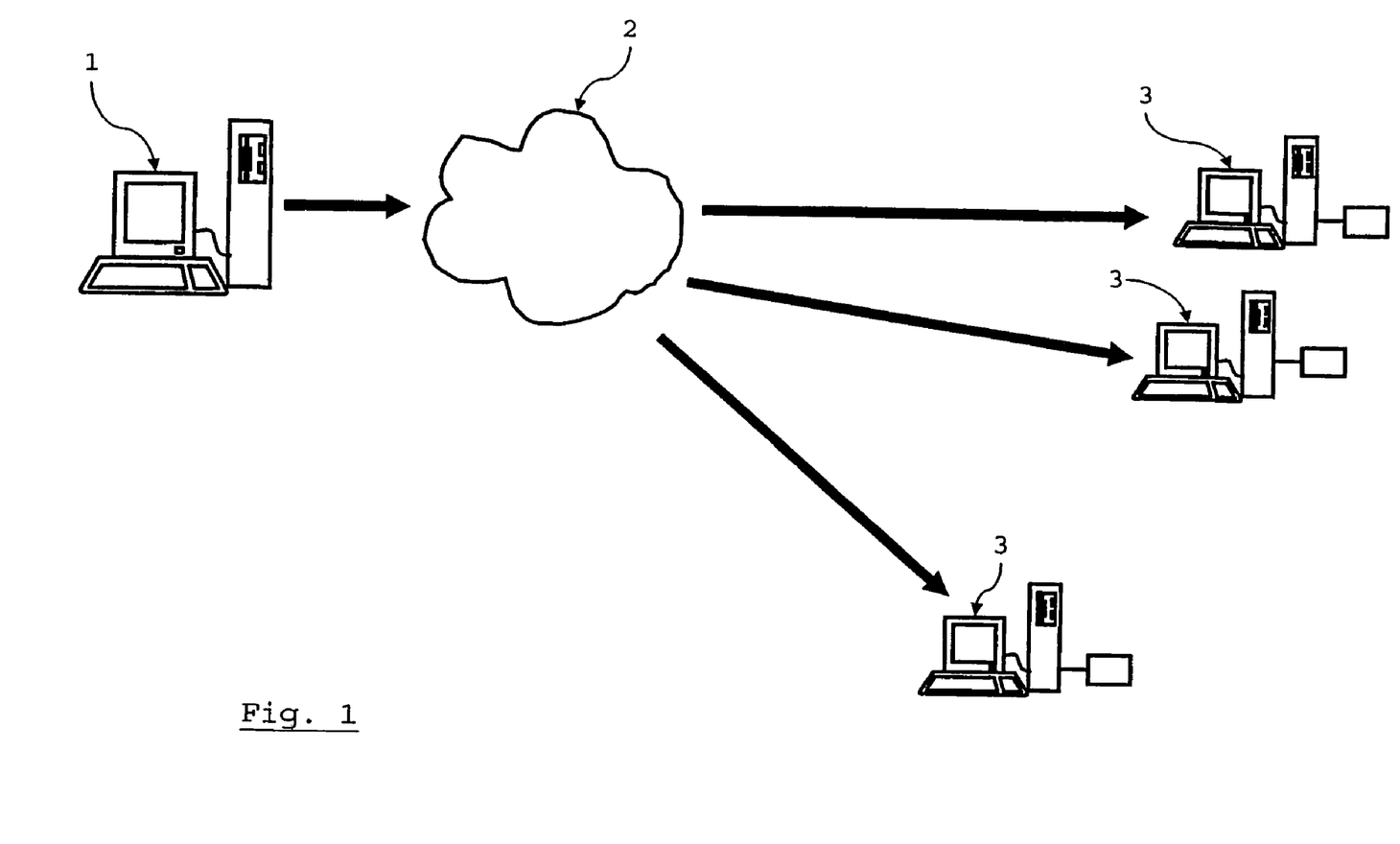
FIG. 1 shows a general overview of an embodiment of the system according to the invention, suitable for multicasting.

An embodiment of the system according to the invention, as used for multicasting, broadcasting or unicasting data, is shown in FIG. 1. It comprises a transmission side, hereinafter referred to as head-end 1. The system can be implemented in a variety of ways using a variety of equipment ranging from one single standalone device to a multitude of computers and devices linked on a network (LAN, WAN or dial-up links).

The head-end 1 is the point at which content is gathered and formatted. The head-end 1 uses a method for secure packet-based broadcasting of content data according to the invention to encrypt the content data, generating packets with encrypted data. The encrypted content data is multiplexed, if needed, and then broadcast. These functions can be carried out at one central location or a multitude of locations each performing a certain function on the content.

The output of the broadcast head-end 1 is packet-based data, e.g. IP data, with the content encrypted, which is then broadcast on a broadcast network 2. This can be any network: satellite, cable, terrestrial, DSL (digital subscriber line), the Internet, LAN, WAN, Wireless (GPRS, UMTS) or any future type of network that provides access to the operator's subscribers. The broadcast network 2 can also be an internet, a collection of connected networks of different types. The operator refers to the entity that provides an encrypted multicast service to authorised subscribers.

If the network 2 is an IP network, then the IP Multicast protocol is advantageously used to broadcast content to the operator's subscribers and not to all the internet users. The content is multicast and received by the terminals of the subscribers, hereinafter referred to as clients 3. A client 3 can be any receiving device that is able to receive the multicasts and render the content (PC, set-top box, or any other terminal). The client 3 typically comprises a PC that is equipped with a secure device and some software. The secure device can be a smart card interfacing to the PC by means of a smart card reader.

Standard software for receiving packet-based data is run on the client 3. It comprises a collection of programs for processing different parts of the data packet. They are hierarchically layered in a network protocol stack. If the data has been broadcast according to the IP protocol, then the software used to process the received data packets at the client 3 is said to form an IP stack. Software at the lowest level extracts the first header, the IP header, comprising an IP address. If a data packet has arrived at the client 3 in data packet fragments, then these are buffered, until the entire packet is complete. Software at a higher level ensures that the data is provided as input to the correct program. This software uses a further header in the data packet, encoded according to a transport layer protocol, such as UDP or TCP.

A client 3 in the system according to the invention receives the broadcast data packets. As mentioned above, the packets with encrypted data received by the client 3, have been generated from a fragment of an unencrypted payload, using a method according to the invention. In the preferred embodiment, the fragment size will have been chosen to keep the size of the packets with encrypted data below a maximum transmission unit of the network. They will therefore not arrive in fragments, obviating any need for buffering.

The encrypted data in the packets is then decrypted at the client 3 using a method for processing received data packets according to the invention. The client 3 comprises a decryption unit for decrypting the encrypted data comprised in the received data packets and for generating data packet fragments from the decrypted data, which can be passed to the software in the network protocol stack. It thus renders clear multicast data to an application.

Head-End

Figure 2:
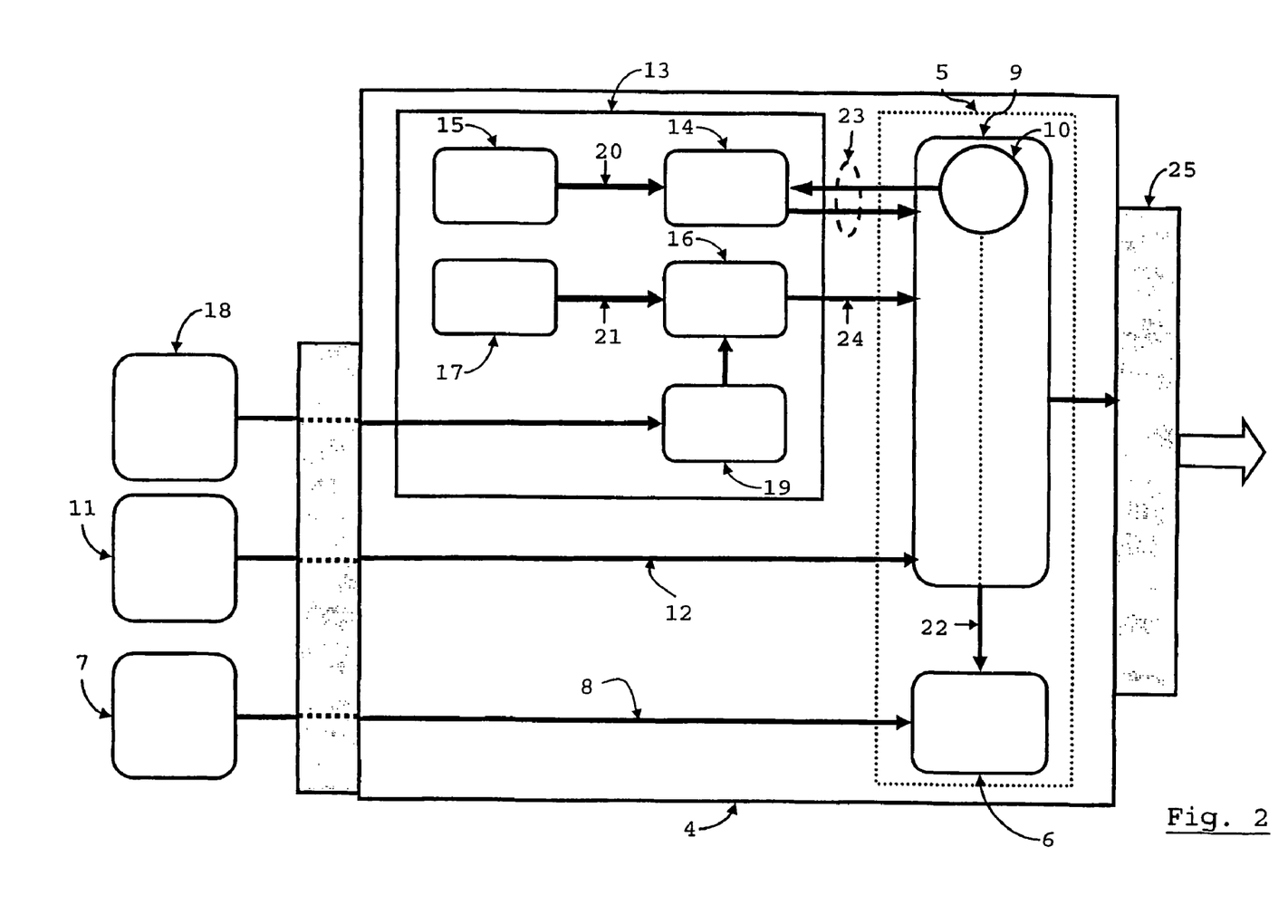
FIG. 2 shows a component diagram of a head-end in an embodiment of the system according to the invention, which is suitable for carrying out a method for secure packet-based broadcasting of data according to the invention.

An embodiment 4 of a head-end according to the invention is shown in FIG. 2. It contains an IP encryption system 5. This system 5 is typically a PC running in the head-end 4 and could be equipped with some specialised hardware to perform the IP encryption. The IP encryption system 5 is a set of software and/or customised hardware that has the function of encrypting and managing one or more encrypted multicast channels/ services. A service is made up of one or more streams. For example a service can be made up of stream1=video, stream2=audio1 stream3=audio2).

The encryption system 5 could be implemented as a server dedicated to the above-mentioned tasks or it could be a program that is run on a PC performing many other functions. The encryption system 5 is advantageously implemented using a good redundancy scheme to ensure that the encryption system 5 is always available to avoid any disruption in service.

The encryption system 5 comprises an encryption unit 6. The encryption unit 6 of the IP encryption system 5 retrieves clear data packets comprising a clear data packet header, the IP header, an address, the IP address, and an unencrypted payload, the data that is to be broadcast multicast, or unicast. These IP data packets originate from a source 7 and pass through an interface 8 to the encryption unit 6. The source 7 can be a multicast streamer or any other appropriate content source. The interface 8 is preferably implemented using the IP/UDP protocols, although any other suitable protocol, e.g. IP/TCP could equally well be used, as the invention does not depend on the protocols used for communication between components at the head-end 4

The encryption unit 6 can be implemented as a separate hardware card for performance improvement or as a computer program running on a server. In any encryption system 5 there can be one or more of these encryption units 6 and they can be located in the same or different locations. The output of the encryption unit 6 comprises encrypted IP packets.

The encryption unit 6 encrypts the data using keys received from an encryption manager 9, comprised in the encryption system 5. The encryption manager 9 comprises a Key Generator function 10, symbolically depicted in FIG. 2.

The encryption manager 9 is the unit that manages the Encryption process. It has the following functions:

Specifying Key cycle periods (how often the encryption keys are changed).
Interfaces to the CA System 13.
Determining Time to Live of the transmitted IP Packets.
Sending conditional access messages to the receivers;
Interfaces to an external scheduler, e.g. an external station management system, to receive announcements. Announcements are used to define Streams from a Scheduler. This is a way to define a stream from an external system.
Interface to network adapters for receiving and sending of data.
Encryption of static services to be encrypted.
Generating and transferring of keys to the encryption unit(s) 6.

The Key Generator Function 10 in the encryption manager 9 will be called upon to generate random keys of the required length at a set interval. One embodiment, proven to provide adequate security in practice, uses a 56 Bit Key and the Blowfish Algorithm to encrypt the IP data, but any appropriate algorithm or key length can be used. The encryption manager 9 can receive announcements from a local scheduler or an external station management system 11 to change or define new streams in a broadcast. Announcements from the external station management system 11 pass through an interface 12 between the external station management system 11 and the encryption manager 9. The interface 12 can, for example, make use of the IP/UDP protocol or the IP/TCP protocol.

The head-end 4 further comprises a Conditional Access (CA) System 13. The CA system 13 can be implemented as a set of programs on the encryption system 5 or as a standalone system running on it's own hardware. The CA system 13 comprises an ECM generator 14, which generates Entitlement Control Messages (ECMS) using encryption keys and access conditions. The Key generator function 10 provides the former, a Service Manager 15 provides the latter.

As part of the invention, these ECMs are intended for transmission to the clients 3 as data packets, referred to as IPECMs. By transmitting ECMs comprising decryption information as data packets, a client 3 can selectively be authorised to receive data belonging to a particular service. Only if the client 3 is able to extract the key and other decryption information, like the algorithm used, from the ECMs sent with a particular service, can the client 3 also decrypt the packets with content data provided as part of the service.

An EMM generator 16 in the CA system 13 generates Entitlement Management Messages (EMMs), also intended for transmission to the clients 3 as data packets. These are referred to as IPEMMS, which are used to authorise and de-authorise clients to make use of a particular service. EMMs and ECMs are commonly used in conditional access systems, which are known in the industry, and are not explained here in greater detail.

The EMM generator 16 will receive subscriber management commands from a local Subscriber Management System (SMS) 17, which contains subscriber details, or from an external SMS 18 interfacing through an SMS interface 19. This interface 19 will in most embodiments be implemented using the IP/TCP protocol or a similar network protocol.

The subscriber management commands will have the format dictated by the exact implementation of the CA system 13 that is used, but are typically commands to
  activate a subscriber;
  deactivate a subscriber;
  add an entitlement (access profile);
  delete an entitlement;
  set/reset passwords; and
  get/put credit for Pay Per View (PPV), and commands for any other function that might be needed to manage the secure module of the CA system 13.

Interfaces 20, 21 are provided for communication between the service manager 15 and the ECM Generator 14 and between the SMS 17 and the EMM Generator 16, respectively. The interfaces 20, 21 can, for instance, be implemented using the Distributed Component Object Model, or a similar type of interface, such as the Common Object Request Broker Architecture.

The EMMs and ECMs are returned to the encryption manager 9. The encryption manager 9 will add packet headers, additional information and checksum to create the IPECM and IPEMM messages.

Keys are passed from the encryption manager 9 to the ECM generator 14 and ECMs are returned through an interface 23.

EMMs are passed from the EMM Generator 16 to the encryption manager 9 through another interface 24. These interfaces 23, 24 can be implemented using IP/UDP and IP/TCP protocols. It is also possible to authenticate and encrypt the communication between the IP encryption system 5 and the CA System 13 using known techniques such as public key cryptography or any other suitable scheme.

INFO-messages will also be created for transmission to the clients as data packets, to indicate the location of the IPECMs and IPEMMs. Thus, by sending clients 3 Information Messages identifying a service and comprising information for receiving messages belonging to the service, the IPEMMs and IPECMs, they will know how to recognise packets encoding the EMMs and ECMs. If the Internet Protocol is used to generate data packets, the packets with encrypted data and the IPEMMs and IPECMs can easily be identified by an IP address or port. A client 3 will recognise a data packet as belonging to a service by the address in the IP header or a port in the TCP or UDP header.

The IPEMMs and IPECMs can be sent to the clients 3 as a separate data stream using any suitable network. It could be the same network 2 as is used for broadcasting the content or another one. It is possible to send them separately, because the INFO-messages enable clients 3 to recognise the IPECMs and IPEMMs.

To send the data packets comprising the encrypted content data and the data packets comprising the CA messages (the IPEMMs, IPECMs and INFO-messages) the head-end 4 has a network interface 25.

In one embodiment of the method for secure packet-based broadcasting of content data according to the invention, the data packets comprising the CA messages are provided with a different (IP) address and/or port from the packets with encrypted data. This allows the messages to be sent as separate data streams, in other words, out of band. It is also conceivable that the messages are sent out of band by setting a flag in the header of each data packet containing part of the message. This allows the messages to be distinguished from the packets comprising encrypted content data.

It is an advantage to treat the CA messages sent as data packets separately, since decryption keys will change. Obviously a new key must be available at the client 3 before packets with data encrypted under the new key arrive at the client 3, to prevent the decryption process from stagnating.

In a preferred embodiment, an INFO-message transmitted on the network 2 has the following format:

| Identifier | Value |
| --- | --- |
| Sync/ID | "INFO". |
| Message Length | This value is the byte count of this message, include all the fields from the Sync/ID field to the checksum field. |
| Interface Version | Defines a version number associated to the format of this message structure. |
| CA Version | Defines the type and version of the Conditional Access System 13 installed on the Head-end 1; 4. |
| Operator ID | Assigned per operator. |
| Length of Operator Name | N |
| Operator Name | The organisation supplying the content. |
| IP Version | IPV4/IPV6. |
| ECM IP Address ECM IP Port | How to locate ECM messages. |
| EMM IP Address EMM IP Port | How to locate EMM messages. |

-continued

| Identifier | Value |
| --- | --- |
| Length of Reserved Data | M. |
| Reserved Data | To be used for small unforeseen changes in the interface without changing the interface version. |
| Length of Authentication Data | L |
| Authentication Data | To be used in Authenticating the sender of this message. |
| Checksum | The Internet Checksum defined in RFC1071 can be used. The method uses octet pairs to form 16bit integers and the 1's complement sum is calculated. Any other suitable checksum can also be used. |

An example of an IPECM transmitted on the network 2 has the following format:

| Identifier | Value |
| --- | --- |
| Sync ID | "ECM" |
| Total Message Length | The data size of this message. |
| Interface Version | Defines a version number associated to the format of this message structure |
| Operator ID | Assigned per operator. This is the operator of the multicast service. |
| Service ID | |
| Encryption Flag | Encrypt/Do not Encrypt Stream |
| Algorithm Indicator | Which algorithm is used for encryption |
| Algorithm Key Length | Length of Key |
| Add/Remove Flag | Add/Remove Service |
| Even/Odd Key Cycle Indicator | Odd/Even Key |
| Length of ECM Payload | N |
| ECM Payload | This is the ECM, as received from the CA system 13, containing the access conditions and the encryption key. It is usually encrypted and authenticated. |
| Length Service Name | L |
| Service Name | Example: "News". |
| Length of Product Name used for Service | Q |
| Product Name used for Service | Example: "News Product" |
| IP Version | IPV4/IPV6. |
| Number of Streams | M |
| Length Stream #1 Name | X |
| Stream #1 Name | X |
| Stream #1 IP Address | The address used for packets with encrypted data belonging to stream #1. |
| Stream #1 IP Port | The port used for packets with encrypted data belonging to stream #1. |
| ... | Used for further streams provided with the service. |
| Length Stream #M Name | |
| Stream #M Name | |
| Stream #M IP Address | |
| Stream #M IP Port | |
| Length of Reserved Data | M |
| Reserved Data | To be used for small unforeseen changes in the interface without changing the interface version. |

-continued

| Identifier | Value |
| --- | --- |
| Length of Authentication Data | L |
| Authentication Data | To be used in Authenticating the sender of this message. |
| Checksum | The Internet Checksum defined in RFC1071 can be used. The method uses octet pairs to form 16bit integers and the 1's complement sum is calculated. Any other suitable checksum can also be used. |

An example of an IPEMM transmitted on the network 2 has the following format:

| Identifier | Value |
| --- | --- |
| Sync ID | "EMM". |
| Total Message Length | Indicates the data size of this message. |
| Interface Version | Defines a version number associated to the format of this message structure |
| Operator ID | Assigned per operator |
| Length of EMM Payload | N |
| EMM Payload | This is the EMM, as received from the CA system 13, containing the entitlements (access profile) for the subscriber (client 3). It is usually encrypted and authenticated. |
| Length of Reserved Data | M |
| Reserved Data | To be used for small unforeseen changes in the interface without changing the interface version. |
| Length of Authentication Data | L |
| Authentication Data | To be used in Authenticating the sender of this message. |
| Checksum | The Internet Checksum defined in RFC1071 can be used. The method uses octet pairs to form 16bit integers and the 1's complement sum is calculated. Any other suitable checksum can also be used. |

The IP Encryption System 5 comprises an interface 22 between the encryption manager 9 and the encryption unit 6, making use of messages, of which two important ones are the 'Define Stream'-message and the 'Define Key'-message.

The 'Define Stream'-message defines a single channel of application data (content to be used by an application on the client 3) to be encrypted and distributed by the head-end 4. A single "stream" is identified by a unique IP address and port combination. For example, data being transmitted on address 224.0.0.1, port 1001, could be a single stream, named perhaps "Audio". Data on address 224.0.0.1, port 1002 could comprise another stream, named perhaps "Video". It is also possible to specify all ports, so that a stream is identified by the IP address on its own. The message can be used both to add a stream to a service and to remove it. A reply message from the encryption unit 6 is used to acknowledge receipt of the 'Define Stream'-message.

The 'Define Key'-message defines the key to be used associated with a service. Key length and key contents are specified in this message. The encryption algorithm and time to live for the IP packets generated from this information can also be specified, as well as any additional information. A reply message from the encryption unit 6 to the encryption manager 9 is used to acknowledge receipt of the 'Define Key'-message.

Client

Figure 3:
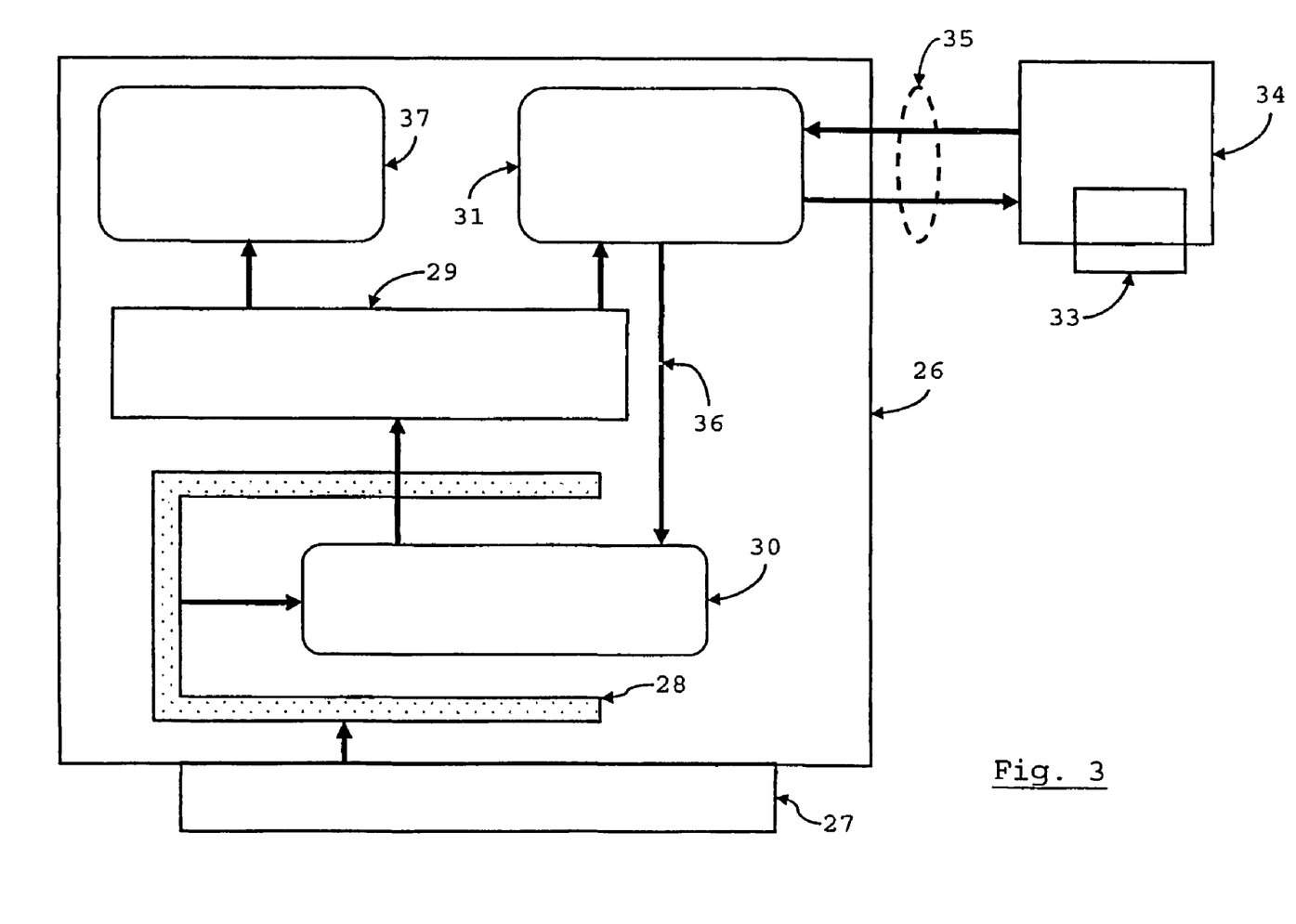
FIG. 3 shows a component diagram of a client according to the invention.

As is shown in FIG. 3, an IP Decryption System 26 of the client 3 comprises an IP receiver 27 for receiving broadcast, multicast and unicast IP data. The IP receiver 27 can be a modem, a network interface or any other device capable of receiving data from the network 2.

The IP receiver 27 passes the received data packets to a client's NDIS-layer 28 [NDIS: Network driver Interface Specification is a standard API (application program interface) for network drivers.] The NDIS-layer 28 provides the possibility to obtain IP fragments, before they are passed to an IP stack 29. Although NDIS is specified here as the preferred network driver interface layer, any other layer can be used that provides access to the IP fragments before they are passed to the IP stack 29.

The IP stack 29 has the function of receiving the fragments of an IP packet, buffering them if needed until all are received, and then combining them in a complete IP packet. In this invention, a decryption unit 30 intercepts the fragments from the NDIS-layer 28, before they are passed to the stack 29. Each fragment is decrypted and immediately passed on to the IP stack 29 via the NDIS-layer 28 thereby eliminating the need for buffering in the IP decryption unit 30.

This element of the invention has the effect that the decryption process imposes a very small processing overhead to the client 3. Passing the fragments to the IP stack 29 via the NDIS-layer 28 has the advantage of making the complete encryption process transparent to the IP stack 29. The IP stack 29 does not have to be customised to provide an interface to the IP decryption unit 30.

Using the method for secure packet-based broadcasting according to the invention, the size of the IP packet will already have been adjusted to the maximum transmission unit of the broadcast network 2. The fragments with encrypted data arriving at the client 3 will thus generally comprise an entire IP packet, so buffering before encryption is not necessary.

Another element of the IP Decryption System 26 is a decryption manager 31. It will process IPECMs, IPEMMs and INFO-messages, received from the IP stack 29 through an interface 32. The decryption manager 31 will extract the ECMs and EMMs from the IPEMMs and IPECMs and send them to a secure element. The decryption keys are received back from the secure element if the secure element is authorised to receive the content.

The secure element can be implemented in secure hardware or if that becomes feasible, secure software. In the embodiment shown in FIG. 3, the secure element is a smart card 33, inserted into a smart card reader 34, connected to the client 3 through an interface 35. The interface 35 makes use of a known standard for data exchange, e.g. Peripheral Component Interface or Universal Serial Bus.

Information, including the decryption keys, is sent from the decryption manager 31 to the decryption unit 30 through an interface 36, making use of a low level communication method, such as IOCTL, for use in decrypting the IP fragments.

The decryption manager 31 uses the INFO-messages that it receives to locate the IPECMs, IPEMMs and encrypted content. The information that is sent to the decryption unit 30 from the decryption manager 31, through the interface 36, comprises IP addresses, IP ports and keys.

Once the decrypted IP fragments have been assembled to IP packets again by the IP stack 29, these IP packets are processed and the clear content is passed to an application 37 or applications on the client 3 that use the broadcast content. The content can be used for displaying, storing on a storage medium, reformatting or any other action on the content or passing the content to another device or application. The complete decryption process is invisible or transparent to the application(s) 37.

The interface 36 provided between the decryption manager 31 and the decryption unit 30, makes use of messages, of which two important ones are the 'Define Stream'-message, to define a stream of content data for a service, and the 'Define Key'-message, to communicate a new key to the decryption unit 30. In the preferred embodiment, the format of the 'Define Stream'-messages and the 'Define Key'-messages is substantially the same as that of the identically named messages used for communication between the encryption unit 6 and encryption manager 9 in the IP encryption system 5. Further messages between the decryption manager 31 and the decryption unit 30 are foreseen, depending on the particular configuration of the client 3, but these messages are not essential to the present invention.

Encryption Unit Processing

Figure 4:
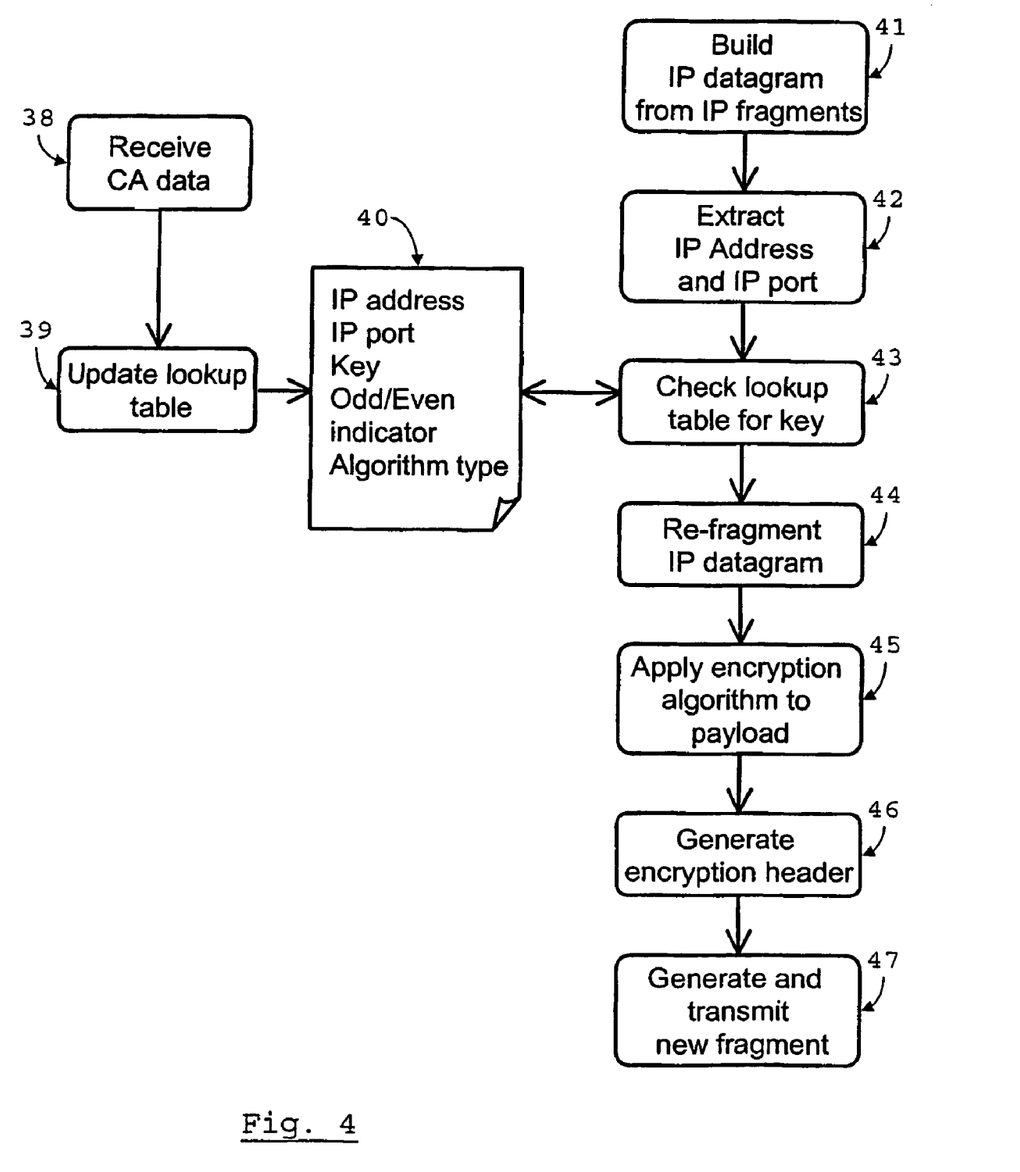
FIG. 4 shows a flow diagram with selected steps in the encryption process.
Figure 5:
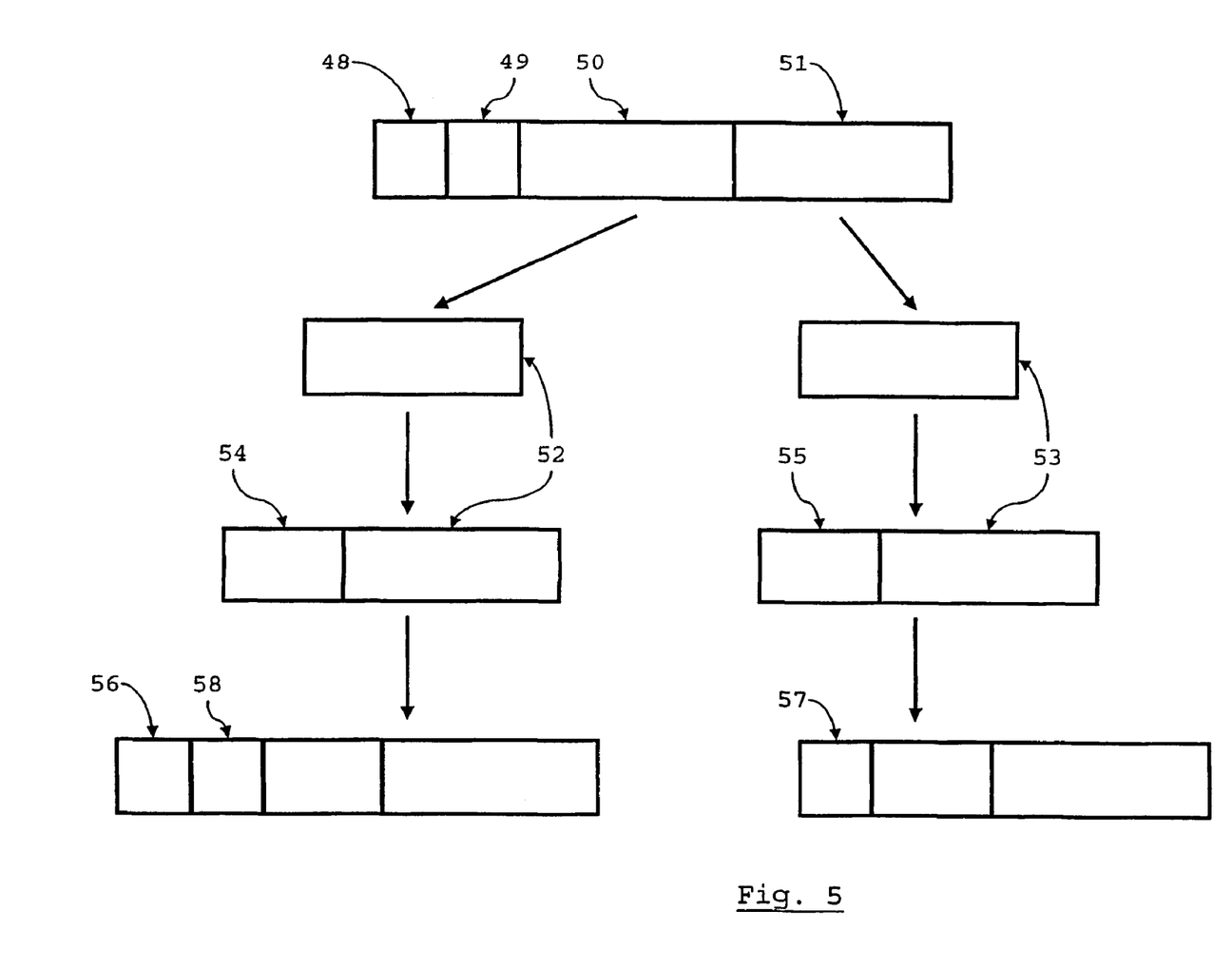
FIG. 5 shows the generation of packets with encrypted data using a method according to the invention.

The method for secure packet-based broadcasting of content data from the head-end 1; 4 to the clients 3 will now be explained more fully with reference to FIGS. 4 and 5. FIG. 4 shows a selection of processing steps carried out at the head-end 1; 4. FIG. 5 shows the various components of a clear IP packet and the generated IP packet with encrypted data.

One step 38 carried out at the head-end 1; 4 comprises receiving CA data, comprising an encryption key, at the head-end 1; 4, from which service data is extracted. The encryption unit 6 receives the service data, i.e. IP address, port, encryption keys and algorithm type, from the encryption manager 9. This happens periodically as the keys or the service set-up changes.

In a subsequent step 39, a look-up table 40 in the encryption unit 6 is updated using the received service data. This look-up table 40 can comprise service data for several data streams, thus making the head-end 1; 4 suitable for encrypting data from multiple sources and/or multiple streams from one source.

The head-end 1; 4 retrieves a clear data packet, which it has been sent by the source 7. The clear data packet comprises a clear data packet header, in this case consisting of an IP header 48 with an IP address and a transport layer protocol header 49 (UDP or TCP). The clear data packet further comprises an unencrypted payload. Using known techniques, the fragments of this data packet are buffered on arrival at the head-end 1; 4 and the clear IP packet is built.

In another step 42, the IP address and or IP port are extracted from the IP header 48 of the clear data packet, in order to be able to locate the relevant encryption data, essentially the encryption key and algorithm to use, in the look-up table 40. This checking of the look-up table 40 is symbolised in step 43.

In another step 44, the IP data packet is re-fragmented. This means that the unencrypted payload is divided into one or more fragments, to which the encryption algorithm is to be applied in a subsequent step 45. For illustrative purposes, the unencrypted payload in the clear data packet of FIG. 5 is divided into two fragments 50, 51. The resulting encrypted fragments are denoted by reference numerals 52 and 53, respectively.

In the preferred embodiment, the size of the fragments 50, 51 is chosen to keep the size of the packets with encrypted data, which are created as a result of the process, below a maximum transmission unit of the broadcast network 2. The method thus takes account of any extra length added to the data as a result of the encryption process. This provides an advantage in transmission, because the packets with encrypted data composed using the method of the invention need not be re-fragmented again after being sent on their way through the broadcast network 2.

An important step 46 in the method according to the invention, is the generation of an encryption header 54, 55 for each encrypted fragment 52, 53. The encryption header 54, 55 is added to the respective encrypted fragment 52, 53 to form a new payload for the packet to be generated.

If it has been determined that the data size of a packet comprising the entire encrypted payload and the encryption header would exceed a maximum transmission unit of the broadcast network 2, the payload of the clear data packet received from the source 7 will have been divided into at least two fragments in step 44. In the preferred embodiment of the invention the encryption header 54 for the first fragment 50 contains the UDP or TCP checksum and length of the original data packet.

Because the encryption header for at least one fragment is provided with information regarding the length of the clear data packet and information regarding a checksum of the unencrypted payload, re-assembly of the clear data packet at one of the clients 3 is made much simpler. The packet with encrypted data arrives at the client 3 in fragments, which can be encrypted directly on arrival and passed on to the IP stack 29, instead of being buffered separately until all the fragments of one packet with encrypted data have arrived. Thus, buffer space and performance overhead is saved on the decryption side. Software in the IP stack 29 can re-assemble the clear data packet. For this, the checksum and packet length must be present in the first fragment.

The encryption header 55 generated at the head-end 1; 4 for the other encrypted fragment 53 contains the fragment offset of the clear fragment 51. Thus, information is provided in the encryption header for each further fragment, comprising an offset of the further fragment with respect to the first fragment 50. Each packet with encrypted data generated from a further fragment of the clear data packet can be decrypted immediately upon arrival and transferred to the IP stack 29, where the complete clear data packet is re-assembled.

In order that the client 3 can distinguish the packet with encrypted data generated from the first fragment 50 from those generated from further fragments, a flag is provided in the encryption header 54, 55, indicating whether the packet comprises encrypted data from the first or a further fragment of an unencrypted payload. This also means that the encryption header can be smaller, since a data field in the encryption header will either be used to encode the length and checksum of the unencrypted payload, or the offset value.

Although decryption 'below the stack'—i.e. before the packets with encrypted data have passed through the IP stack 29 at the client 3—is preferred, decryption 'above the stack' need not be precluded. In the preferred embodiment of the invention information is encoded in the encryption header 54, 55 for each fragment representing the length of the fragment before encryption and the extra length added by the encryption algorithm. With this information, the standard protocol headers (IP/TCP, IP/UDP) can be modified at the client 3, to ensure that the encrypted payload 52, 53 and encryption header 54, 55 of the packet with encrypted data are correctly extracted at the client 3.

In the preferred embodiment of the invention, the encryption algorithm used by the encryption unit 6 can be selected from one of several available alternatives, as can the length of the key. Accordingly, the encryption headers 54, 55 will be provided with information specifying the encryption algorithm applied to the fragments 50, 51.

Returning to FIG. 4, a last symbolised step 47 comprises composing a packet with encrypted data. The IP Fragment Header checksums and length are modified based on the new payload of encrypted data fragment 52, 53 and encryption header 54, 55. The fragment header, comprising an IP header 56, 57 and a transport layer protocol header 58 for the first encrypted fragment 52, is added to the new payload, to complete the packets with encrypted data. The thus composed packets with encrypted data are then transmitted to the clients 3. Depending on whether the packets are to be broadcast, multicast or unicast, the appropriate address is encoded in the IP header 56, 57 using the possibilities provided by the standard.

Processing Steps in the Decryption Unit

Figure 6:
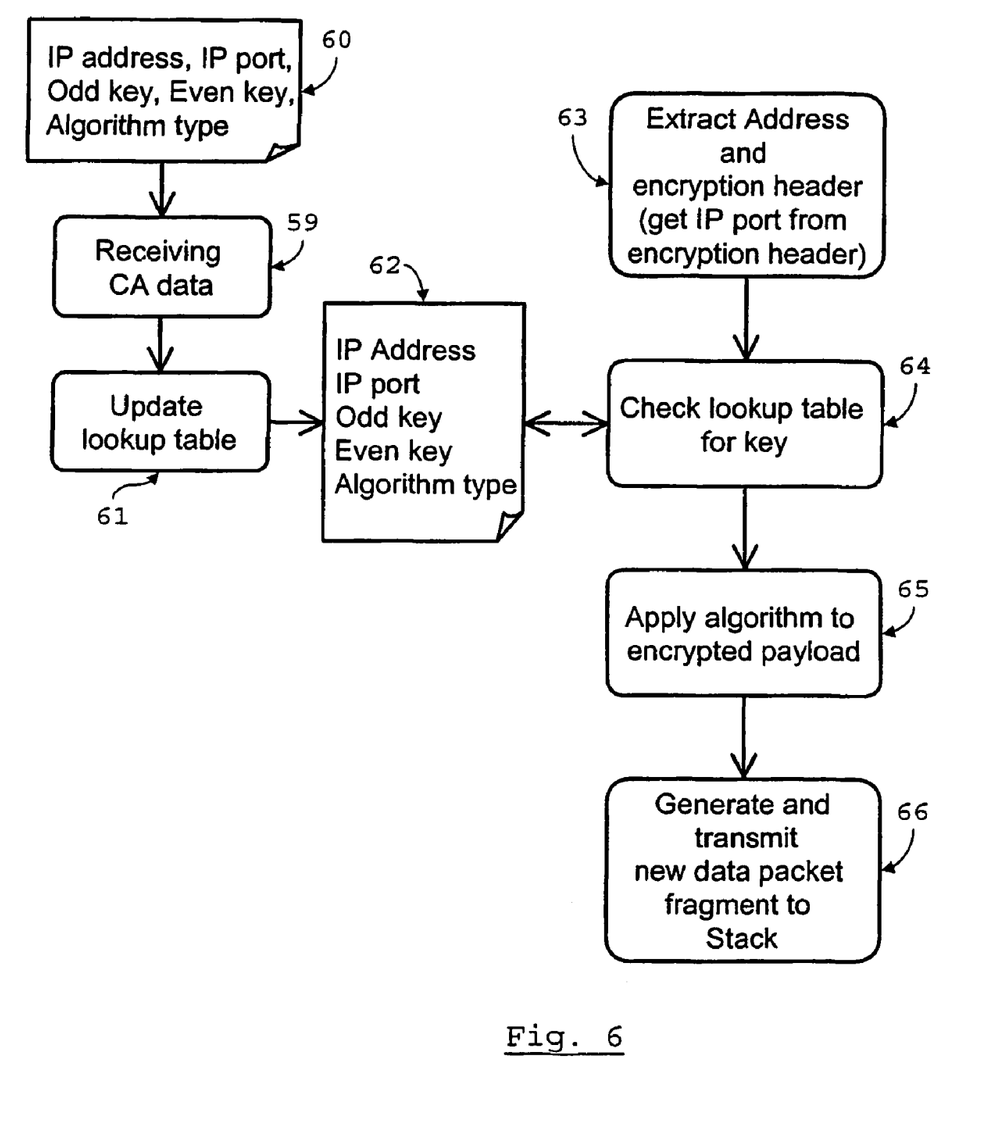
FIG. 6 shows a flow diagram with selected steps in the decryption process.
Figure 7:
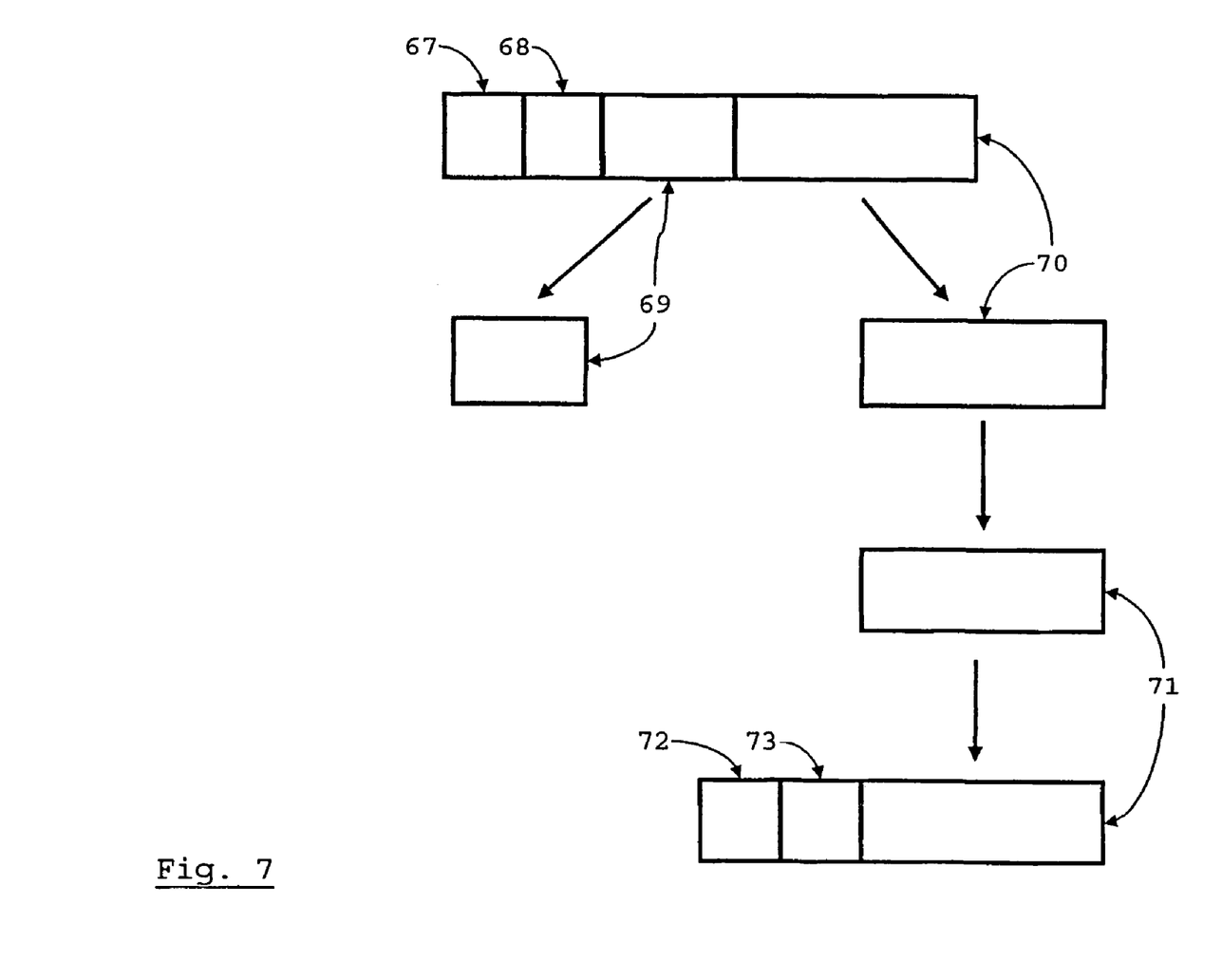
FIG. 7 shows the generation of a clear data packet fragment from a packet with encrypted data using a method according to the invention.

The method for processing encrypted data packets will be explained more fully with reference to FIGS. 6 and 7. FIG. 6 shows several processing steps carried out at a client 3. FIG. 7 shows how a packet with encrypted data, for example the packet comprising the first encrypted fragment 52 of FIG. 5, is processed to generate a clear data packet fragment, which can be passed to the IP stack 29 at the client 3.

A periodically returning step 59 occurs when the decryption unit 30 receives service data 60, i.e. IP address, port, encryption keys and algorithm type, from the decryption manager 31. This step 59 occurs whenever the keys or the service set-up change.

The decryption unit 30 maintains a look-up table 62 for the services it can decrypt. This table 62 is updated with the new service data 60. As explained in the description of FIG. 3, the decryption manager 31 generates this data 60, in co-operation with a secure element, from the conditional access messages received as data packets by the client.

A data packet or data packet fragment with encrypted data is received at one of the clients 3 and received by the decryption unit 30 through the NDIS-layer 28. Referring to FIG. 7, the packet with encrypted data that is provided as an example, comprises an IP header 67, a transport layer protocol header 68, which can be a TCP or UDP header, an encryption header 69 and an encrypted payload 70. Note that, as explained in the discussion of FIG. 5, the transport layer protocol header 68 need not be comprised in every packet with encrypted data.

In a subsequent step 63 in the method, the decryption unit 30 extracts the encryption header 69 and the IP address. It gets the destination port for the clear data packet fragment from the encryption header 69, too.

In the preferred embodiment of the invention, the look-up table 62 links IP addresses and/or IP ports, specified in the received data packets to keys for decrypting the encrypted payload 70. Using the IP address and IP port, the decryption unit 30 retrieves decryption information, including the decryption key from the look-up table 62, in a subsequent step 64 in the method.

In the preferred embodiment, a plurality of keys are valid at any one time, and a key indicator or flag in the encryption header 69 indicates which of these should be retrieved from the look-up table 62. For example, if there are two keys valid at any one time, the service data 60 will indicate which is the odd and which is the even key. A flag in the encryption header 69 will indicate whether the encrypted payload 70 has been encrypted with the odd or the even key. This has the advantage that the ECMs do not have to be included in the stream of content data or ordered in the stream of packets with encrypted data. If only one key is valid at any one time, it would have to arrive at the decryption unit 30 exactly in between the last packet with data encrypted under the previous key and the first packet with data encrypted under the new key The decryption algorithm is subsequently applied to the encrypted payload 70, to generate clear data 71. A clear data packet header is also generated. In the example of FIG. 7 this comprises an IP header 72 and a transport layer protocol header 73. Using information encoded in the encryption header 69 a destination port is included in the TCP or UDP header 73 of the clear data packet fragment, so that the clear data 71 will be provided as input to the correct application 37.

If the packet with encrypted data is the first of a group of related fragments, the encryption header 69 will have been provided with information regarding the length of the clear data packet and information regarding a checksum of the unencrypted payload. This information is extracted from the encryption header 69 by the decryption unit 30, and used to generate the transport layer protocol header 73, to allow reassembly of the clear data packet from clear data packet fragments in the IP stack 29.

If the packet with encrypted data is not the first of a group of related fragments, the encryption header 69 will have been provided with information comprising an offset of the further fragment with respect to the first fragment. The decryption unit 30 will include this offset value in the IP header 72 of the clear data packet fragment it generates, thus allowing concatenation of the group of related fragments into one clear IP packet in the IP stack 29. It is a very advantageous feature of the invention that the buffering of data packet fragments needed for the concatenation thus takes place in the IP stack 29. The decryption unit 30 can, using the method of the invention, pass each clear data packet fragment on to the IP stack 29 through the NDIS-layer 28, as soon as the clear data packet fragment has been generated.

Encryption Header Format

The table below specifies an advantageous implementation of the encryption header format used in the system according to the invention.

| Identifier | Description |
| --- | --- |
| ENCRYPTION FLAGS | D0 . . . D2: Algorithm type |
| | D3: Odd/Even key indicator |
| | D4: Original UDP/TCP Checksum and length or Fragment Offset included in the Encryption header 54, 55; 69:- |
| | 0: Fragment Offset valid (rest of fragments after the first one) |
| | 1: UDP/TCP Checksum and Length valid (first fragment) |
| | D5 . . . D6: Not used for now. |
| | D7: Clear/Scrambled indicator |
| EXTRA LENGTH ADDED BY ENCRYPTION ALGORITHM | Extra length added to the payload by the block encryption algorithm. |
| CLEAR FRAGMENT PAYLOAD LENGTH | Data size of the clear original fragment before the encryption process. |
| UDP/TCP CHECKSUM ORIGINAL Or FRAGMENT OFFSET (OF CLEAR FRAGMENT) | UDP/TCP checksum of original clear UDP/TCP data packet. This field will only be used in the first fragment. The fragment offset to be used after the decryption process in the IP Header of a fragment. This field will be used in all fragments except the first fragment. |

-continued

| Identifier | Description |
| --- | --- |
| UDP/TCP LENGTH ORIGINAL Or | UDP/TCP length of the original clear UDP/TCP data packet for the first fragment. |
| UDP/TCP DESTINATION PORT | The UDP/TCP destination port. Included in all fragments except the first one. |

Different Network Types

Although the invention is specified here for IP packets, the method can be applied to any other protocol in which a message has to be broken up into pieces, sent over a network and reconstructed on a receiving system or terminal, the client. Some examples are, data packets sent on a wireless telephony network such as GPRS or UMTS. The decryption system 26 can be implemented on any terminal designed to receive IP packets. Examples include mobile telephones, Personal Digital Assistants, IP capable household devices such as DVD players, Digital Personal Video Recorders etc. The mechanism of sending IPEMM's, IPECM's and INFO messages out of band, i.e. separate from the stream of packages with encrypted data, can equally be applied to any network that is delivering IP encrypted packets on a multicast or broadcast service.

Other Uses for the Info Messages

The INFO/IPECM messages can be expanded to contain more information about the services that are broadcast, multicast, or unicast. Using this method event information about event on a service could be broadcast, a type of Programme Guide for IP encrypted broadcasts and multicasts. Because of it's compacted nature, this type of information would be useful on a broadcast service where the bandwidth, application space on the receiving client and the display size of the client is limited, such as a mobile telephony network.

Different System Configurations

Figure 8:
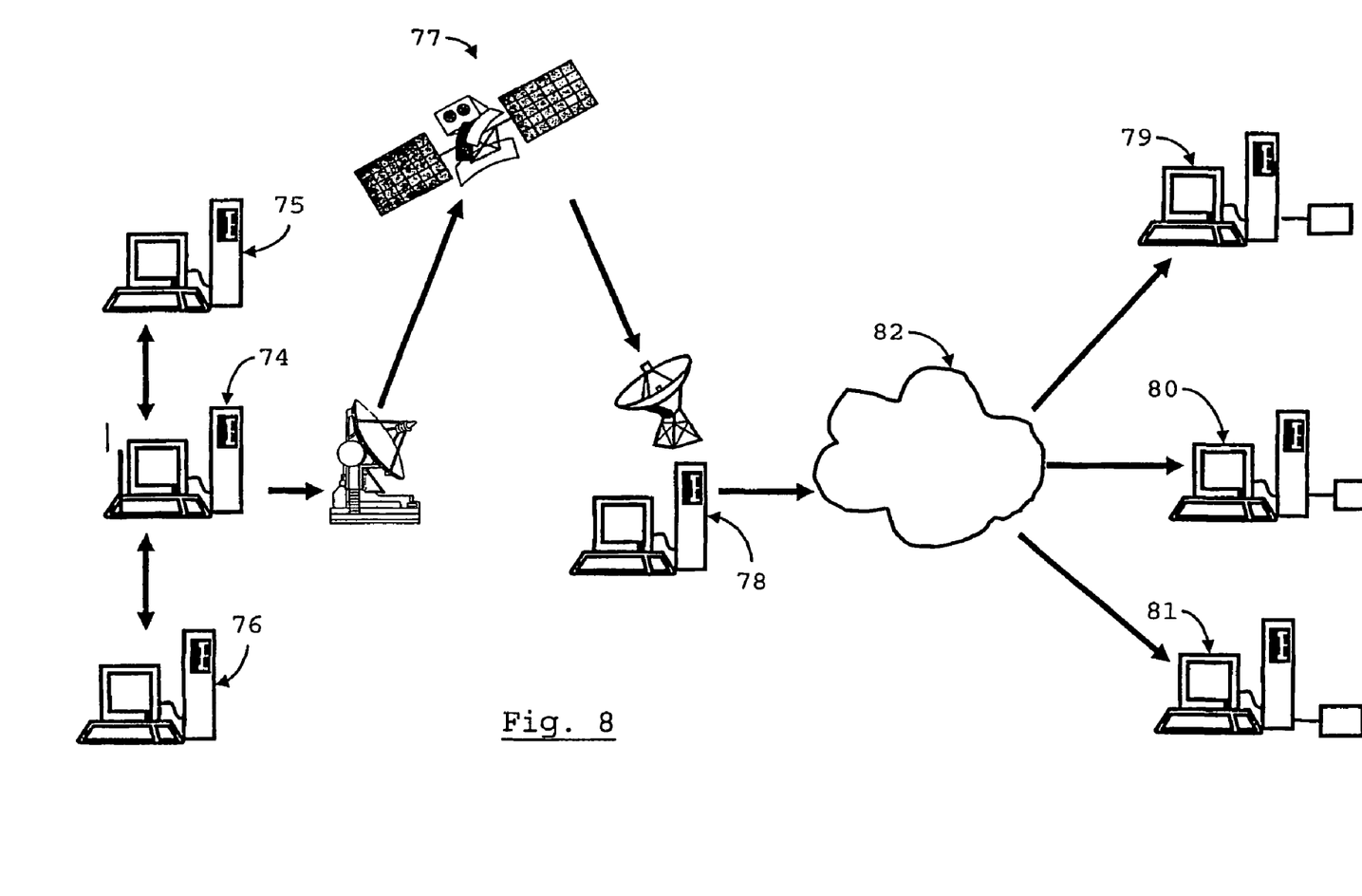
FIG. 8 shows an overview diagram of an embodiment of a system according to the invention using satellite multicasting in which end-client or gateway decryption can be implemented.
Figure 9:
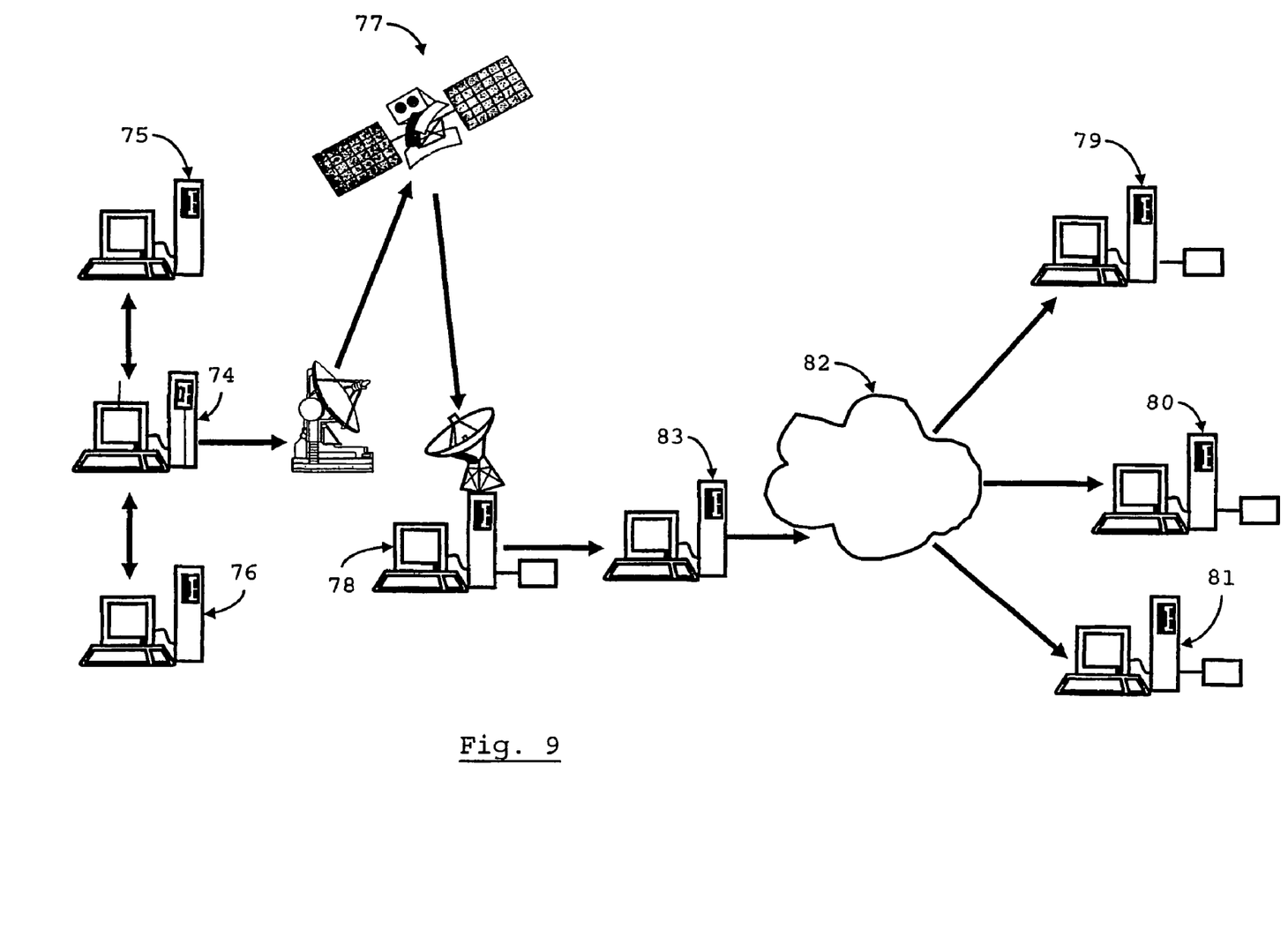
FIG. 9 shows a diagram of end-client decryption in a combined satellite and internet environment.

FIGS. 8 and 9 show two different configurations of examples of the system according to the invention. Two different ways of implementing the system in the configuration of FIG. 8 will be described. The three examples provided below serve merely to illustrate the many possible applications for the system according to the invention. The invention is, of course, not limited to these three examples.

FIG. 8 shows an embodiment, wherein the head-end includes a first computer 74, comprising the IP encryption system 5. The encrypted data packets are generated at this computer 74. Customer care & billing is directed from a second computer 75, which could, for example, serve as the external SMS 18 or the external station management system 11 of FIG. 2, controlling who has access to which service, through the INFO-messages or EMMs broadcast from the head-end 74. A digital content server 76 forms the counterpart of the source 7 of FIG. 2.

Encrypted data packets are broadcast through a first network 77 to a receiving client 78. Other clients 79-81 are connected to the receiving client 78 through a second network 82. In this figure, the first network 77 is shown to be a satellite network and the second one 82 an internet, cable network, DSL network, terrestrial or wireless. The networks 77, 82 can of course be used in any sequence e.g. the first network 77 being an internet and the second 82 a wireless network, etc.

The most basic form of the system is as described in the preferred embodiment with the decryption being done in the end clients 79-81. That is, no intermediate decryption takes place before the data reaches the client.

In a second configuration, the content could traverse more than one type of network, being decrypted by an IP decryption system 26 comprised in the receiving client 78 and then broadcast or multicast in the clear on the second network 82.

In another configuration, the content could traverse more than one type of network before reaching one of the clients 79-81. It is decrypted by an IP decryption system 26 comprised in the receiving client 78, after having been received through the first network 77. However, instead of being passed on straight away, the clear data is re-encrypted using the method of the invention in a computer 83 comprising an encryption system 5, before being multicast on the final network 82, as shown in FIG. 9. In this figure the first network the satellite network 77 and the second one 82 an internet, cable, DSL, terrestrial or wireless network. The networks can of course be used in any sequence.

It will be apparent to those skilled in the art that the invention is not limited to the above-described embodiments, which can be varied in a number of ways within the scope of the attached claims. For example, several additional configurations of the system are possible besides those of FIGS. 8 and 9. In addition, variations or additions to the contents of the various messages and headers composed at the head-end are conceivable, including implementations which make use of other protocols than the IP/TCP or IP/UDP protocols.

The invention claimed is:

1. A method for secure packet-based transmission of content data from a head-end to at least one client, through at least one network to which the head-end and the client are connected, comprising:
   retrieving a clear data packet in accordance to a data packet protocol comprising a clear data packet header in accordance to the data packet protocol and an unencrypted payload;
   dividing the unencrypted payload from the clear data packet into one or more fragments;
   applying an encryption algorithm to each fragment to generate encrypted fragments;
   generating an encryption header for each encrypted fragment;
   composing a packet with encrypted data for each encrypted fragment, comprising the encrypted fragment, the encryption header for the encrypted fragment, and a data packet header in accordance to the data packet protocol; and
   transmitting each of the thus composed packets to the client in accordance to the data packet protocol.

2. The method according to claim 1, wherein, in dividing the unencrypted payload into fragments, the fragment size is chosen to keep the size of the packets with encrypted data below a maximum transmission unit of the network.

3. The method according to claim 1, further comprising retrieving conditional access data specified in the clear data packet wherein the conditional access data is used to generate the encrypted fragments.

4. The method according to claim 1, wherein information is encoded in the encryption header for each encrypted fragment regarding the length of the fragment before encryption and extra length added to the packet with encrypted data relative to the unencrypted data associated with respective clear data by the encryption algorithm.

5. The method according to claim 1, wherein the encryption header for at least one fragment is provided with information regarding a checksum of the unencrypted payload to allow re-assembly of the clear data packet at the client.

6. The method according to claim 1, wherein the encryption header comprises a flag to distinguish the first transmitted one of the composed packets from packets composed from further encrypted fragments generated from the same unencrypted payload.

7. The method according to claim 1, wherein information comprising an offset of an unencrypted fragment with respect a first fragment of the unencrypted payload is provided in the encryption header for the encrypted fragment generated from the unencrypted fragment.

8. The method according to claim 1, wherein information specifying the encryption algorithm applied to the fragment is encoded in the encryption header.

9. The method according to claim 1, further comprising transmitting as data packets Entitlement Management Messages, for authorizing a client to make use of a particular service.

10. The method according to claim 1, further comprising transmitting as data packets Entitlement Control Messages, comprising decryption information, for selectively authorizing a client to receive data belonging to a particular service.

11. The method according to claim 1, further comprising transmitting as data packets Information Messages identifying a service and comprising information for receiving messages belonging to the service.

12. The method according to claim 1, wherein the data packet protocol is an IP protocol.

* * * * *